April 19, 1966  A. L. PARRACK ET AL  3,246,720
SEISMIC REFLECTION AMPLIFIER
Filed Oct. 19, 1961  3 Sheets-Sheet 1

April 19, 1966   A. L. PARRACK ET AL   3,246,720
SEISMIC REFLECTION AMPLIFIER
Filed Oct. 19, 1961   3 Sheets-Sheet 2

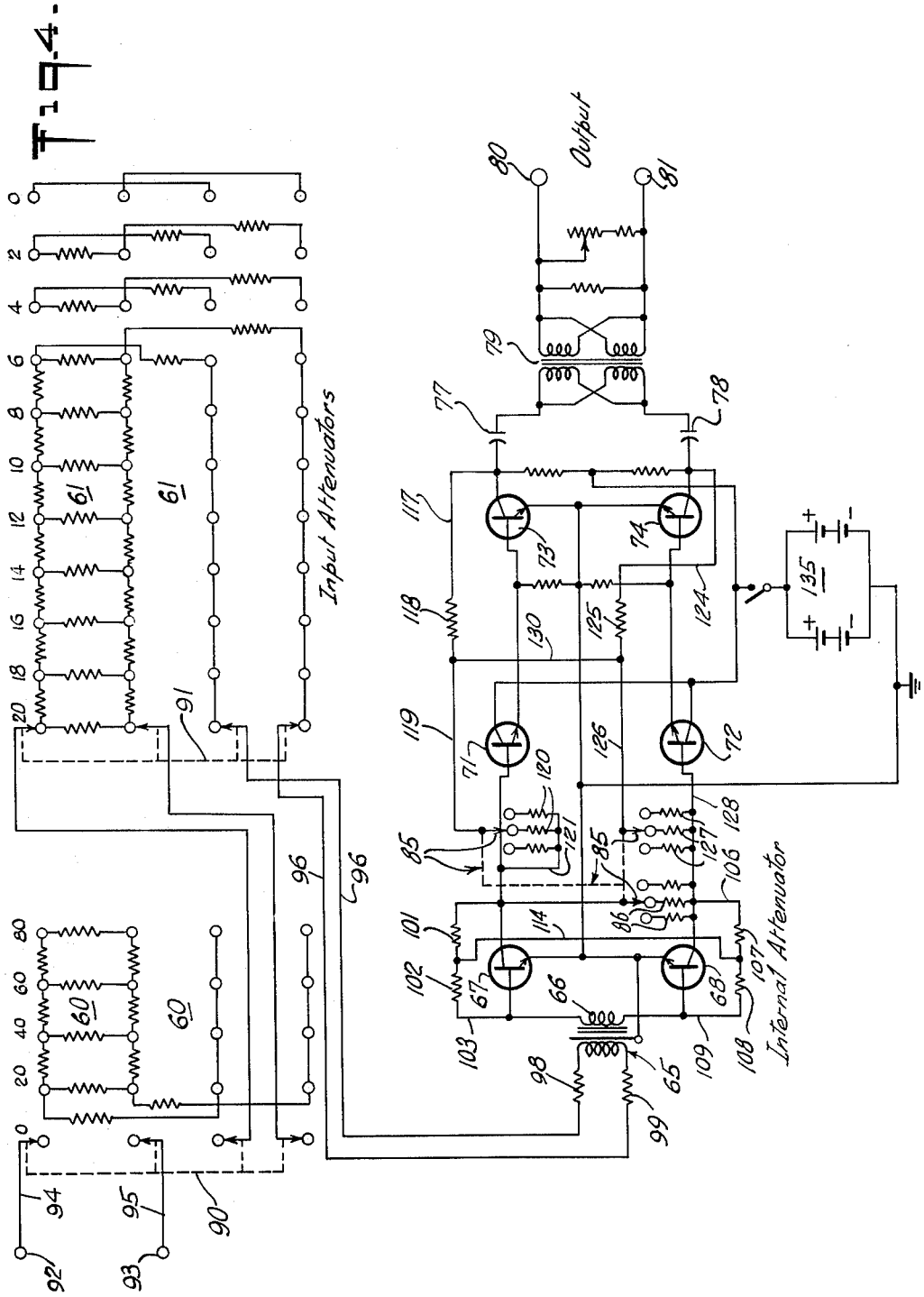

United States Patent Office 3,246,720
Patented Apr. 19, 1966

1

3,246,720
SEISMIC REFLECTION AMPLIFIER
Alvin L. Parrack, Bellaire, and John L. Hudson, Houston, Tex., assignors to Texaco Inc., New York, N.Y., a corporation of Delaware
Filed Oct. 19, 1961, Ser. No. 146,309
2 Claims. (Cl. 181—.5)

This invention is concerned with seismic exploration generally, and more specifically with an improved method that is applicable to reflection type seismic exploration work. The method provides for locating changes in permeability of a given subsurface formation.

Heretofore in seismic reflection exploration work it has been feasible to follow a given formation that is located at considerable depths beneath the surface of the earth, and to plot a contour map of the formation as followed. However under such procedures, no characteristics of the formation per se are provided, with the exception of extreme changes in characteristics, such as in cases where differences in the amount of reflection of energies being received are readily noticeable. Furthermore, even in the latter event the interpretation of the indications thus obtained has been open to considerable question with regard to the characteristics of any given subsurface formation, and the level of reflection amplitudes for an average of a group of traces has been merely employed to help recognize the existance of a reflection.

Consequently it is an object of this invention to provide an improved reflection type seismic method that employs a linear amplifier, and whereby the characteristics of a subsurface formation from which seismic reflections are obtained, may be directly determined.

Another object of this invention is to provide a superior amplifier system that is particularly adapted for seismic operations, and that provides for a highly linear characteristic amplification extending over a signal frequency range of from about two to about five hundred cycles per second.

Briefly the invention concerns a seismic method of determining the coefficient of reflection of a subsurface layer. The method of the invention comprises the steps of generating seismic energy near the surface of the earth, and causing said energy to penetrate downward in the earth so as to be reflected upward from said layer. The invention also comprises the steps of detecting said reflected seismic energy and generating an electric signal corresponding thereto, plus the step of amplifying said electric signal linearly over a wide seismic frequency range whereby changes in amplitudes of said reflected seismic energy may be noted to indicate changes in the coefficient of reflection of said subsurface layer.

Again briefly, the invention may be described as one that is applicable to seismic geophysical exploration in particular and that encompasses the improvement which comprises an electronic amplifier having highly linear characteristics over a range of signal frequencies from about two to about five hundred cycles per second. The foregoing amplifier comprises a direct coupled transistor amplifier having an input attenuator and low frequency transformers at the input and the output thereof.

The foregoing and other objects and benefits of the invention will be more fully appreciated in connection with the detailed description which follows and which is illustrated in the drawings, in which:

FIGURE 3 is another schematic diagram illustrating a

Figure 5:
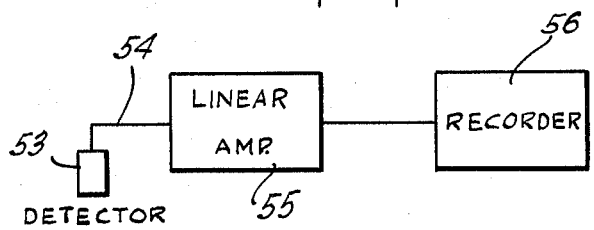

2 different modification of a method according to the invention;

FIGURE 4 is a schematic circuit diagram illustrating a preferred form of an amplifier and related elements according to the invention; and FIGURE 5 is a schematic block diagram illustrating the elements concerned with transforming a seismic signal to an electrical signal and then amplifying and recording the latter.

As has been discussed in general above, the techniques of reflection type seismic exploration operations have progressed through various degrees of improvement insofar as the ability to obtain more information from the data available upon carrying out reflection type operations. Thus it will be understood by those skilled in the art that various techniques have been applied in reflection seismic operations in an attempt to improve the recognition and ability to follow reflections from a given subsurface formation, i.e. by correlating reflections from one location (and corresponding recording) to the next. However, all such work previous to the subject invention has related to determining the vertical location of a subsurface formation so as to be able to make a contour map of such formation and thus relate the topography of the formation's subsurface location to other known data with regard to any such formations. From such information, geologists and others skilled in such work have tried to locate the most favorable areas for possible zones of raw petroleum products.

The applicants' invention enables a better indicator to be determined, in that the characteristics of the formation that is being followed by reflected energy from the upper or the lower surface of such formation, may be determined directly. Such determination is made from the characteristics of the signals which are being obtained in connection with locating the reflecting surface and in conjunction with other aspects of the invention. This means that should a formation that is being followed change in characteristics to become more porous for example, the fact of such characteristic change may be directly determined and consequently a so-called stratigraphic trap may be found directly from the seismic data. Heretofore, any such geologic structure as a mere stratigraphic trap without accompanying structural closure has been substantially impossible to determine from a seismic reflection survey. Consequently, many potential producing zones undoubtedly never have been discovered.

A most important characteristic of potential oil or other petroleum product bearing formations is the permeability thereof. Furthermore, it will be appreciated that the coefficient of reflection of a formation is proportional to the product of the density and the velocity of seismic wave propagation, and as changes in permeability will result in changes in both the density and the velocity of wave propagation there will be changes in the coefficient of reflection associated with changes in permeability. Consequently, in order to determine changes in permeability of a given subsurface formation, a determination of the coefficient of reflection of seismic energy from such formation may be made in accordance with this invention.

One method for determining the coefficient of reflection may be described in connection with the illustration of FIGURE 1 where a series of reflection seismograph recording stations are illustrated with ray paths shown for the reflected energies. Thus, there are three locations shown where seismic reflection records are taken. It will be understood by those skilled in the art that this may be done by means of a standard procedure. For example, such a procedure involves detonation of an explosive charge at a location beneath the surface, such as a location 11 indicated at recording location 1. The seismic energy from such explosion will travel downward and reflect from any subsurface layers having sufficient contrast, e.g., each of two subsurface reflecting layers 12 and 13 shown. Consequently the energy will return to the surface where a detector 14 is located to pick up such reflected energy. It will be further understood that the seismic energies picked up by detector 14 are transformed into electrical signals that correspond with the seismic energy waves. These electrical signals are then amplified and recorded for determination of the reflections along with the elapsed time involved. Of course, the actual recording procedure involves the use of a multiplicity of detectors which may be connected in various combinations to a plurality of amplifiers in order to facilitate picking of reflections. But this is old and well known in the art of seismic reflection work, and it will facilitate understanding of the invention to show only a single detector at each location. By continuing to make additional recordings from other locations, e.g. by detonating another charge 17 and picking up the seismic reflections generated which arrive at the surface (the latter by means of a detector 18) reflections from the same layers 12 and 13 may be followed in relation to depth and to the location along the surface of the earth. This procedure will be continued, for example to a third location where a charge 21 will be detonated and the reflections of the seismic energy therefrom will be picked up by another detector 22.

Figure 2:
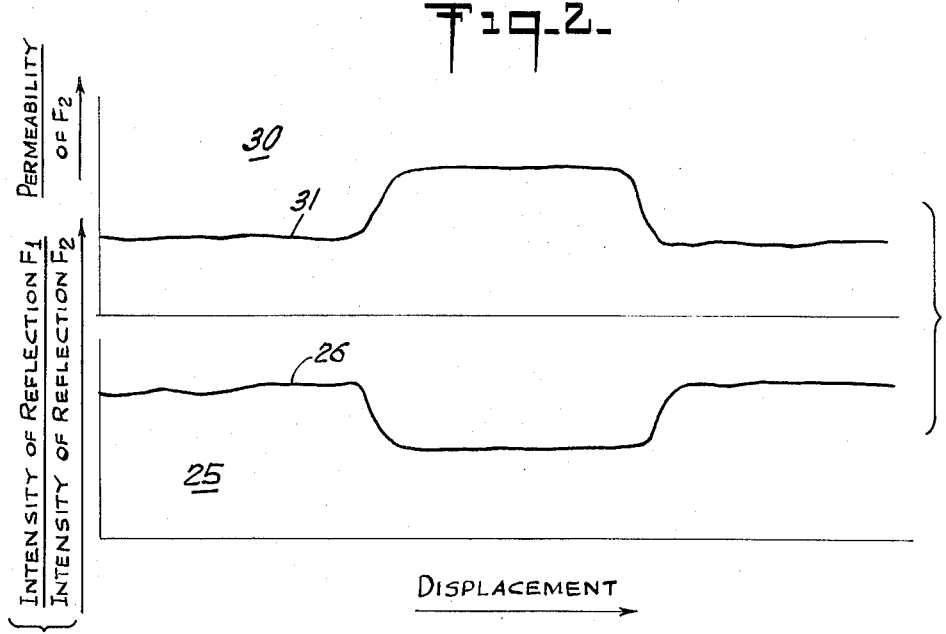
FIGURE 2 is a two part graph illustrating curves which have been plotted from data as related to the FIGURE 1 method.

Having carried out the foregoing procedure so that for each of the series of recordings taken the reflections from reflecting layer 12 could have been correlated from one record to the next and at the same time the reflections from layer 13 could have been likewise correlated, the relative amplitudes of the corresponding reflected energy waves (between those from layer 12 and those from layer 13) may be determined by means of employing a linear amplifier in accordance with this invention. Such relative amplitude determination will be expressed in terms of a ratio, and a graph 25 (FIGURE 2) will be plotted from such results. Thus the ratio of the indicated signal amplitudes may be plotted as the ordinate on graph 25, while the displacement of each reflected signal over the surface of the earth is plotted as the abscissa. The resulting curve is a curve 26 on graph 25 and this ratio of reflection amplitudes, or intensity of reflections, is translatable to provide an indication of the permeability of the formation beneath reflecting layer 13. The latter is illustrated in an upper graph 30 of FIGURE 2 where a curve 31 has been plotted with the ordinate representing the permeability of formation $F_2$ (that lies beneath reflecting layer 13) while the abscissa again represents displacement.

Figure 1:
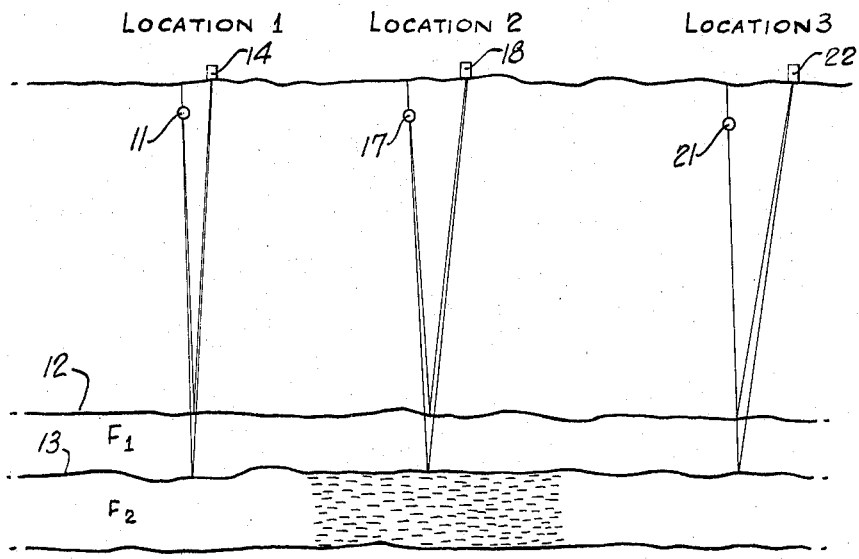
FIGURE 1 is a schematic diagram illustrating one modification of a method according to the invention.

It is to be noted that the abscissa of graph 30 is the same as that of graph 25, so that in both cases by relating the graph 30 and the graph 25 to the data obtained as the reflection records were made, e.g. by relating the two abscissae to the locations which are illustrated in FIGURE 1; the permeability of the formation lying beneath layer 13 will be directly related to the lateral surface location beneath which a change in permeability occurs. Clearly such information is very valuable in that a more porous or permeable formation area having lateral boundaries may be one in the nature of a stratigraphic trap where oil or gas or both may exist.

Figure 3:
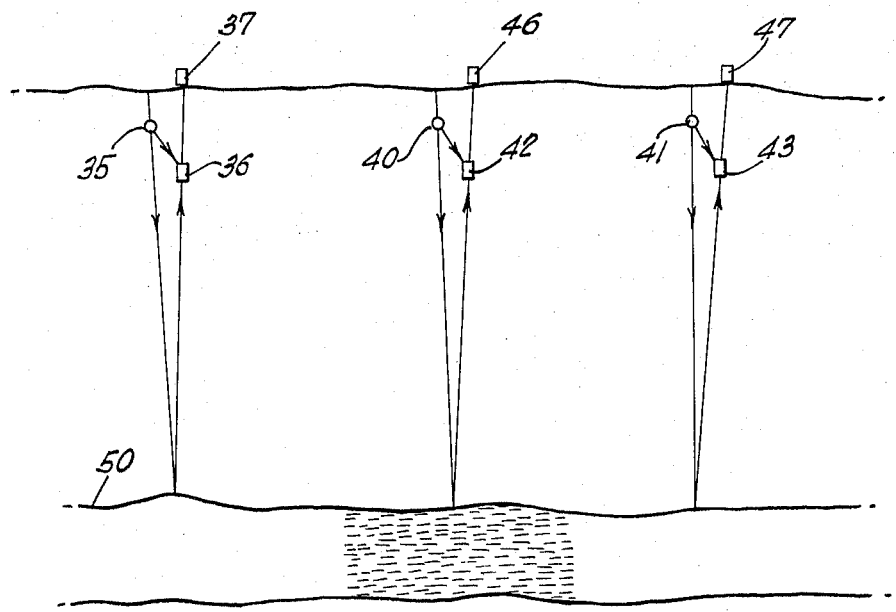

Referring to FIGURE 3, it is pointed out that a modication of a method in accordance with this invention is one indicated by the diagram illustrated in FIGURE 3. Such method involves the same basic reflection seismic procedure as described above in connection with FIGURE 1. However during the carrying out of the FIGURE 3 operations, a record is made at each location of the downgoing seismic energy as it travels outward from the explosive charge after dentonation. Such downgoing seismic energy waves will be employed for a comparison with the reflected energy signals which arrive later after having traveled down for reflection back from a subsurface formation. From the results of this comparison, and by adjusting the reflection signals to a common downgoing signal amplitude level, any changes in reflection signal amplitudes will become readily apparent. In this case a plot may be made of the reflection coefficient of a given reflecting subsurface layer which is directly related to the permeability of the formation beneath such layer, so that a plot similar and directly related to the graph 30 of FIGURE 2 will result.

It will be understood that in both of the foregoing procedures the generated seismic energy is caused to penetrate downward in any of a number of known ways. Among such techniques are the use of water or mud to tamp the explosion created when an explosive material is detonated; the use of a sequentially fired plurality of charges to build up the downward seismic wave front; the use of a plurality of impacts on the surface of the earth with compositing of the resulting records; etc., or various combinations of such techniques.

The foregoing FIGURE 3 method may be understood in greater detail with further reference to FIGURE 3. It will be observed that there is a charge 35 that will be detonated at a first location, and at the same time there is a detector 36 which has been placed below the surface at a lower level than the explosive charge 35. In this manner a record of the form and amplitude of seismic energy traveling downward from the charge will be made. In addition, there is another detector 37 located at or near the surface such that the reflected energy may be picked up and recorded thereby. It will be understood that detector 37 represents a spread of a plurality of detectors in the manner well understood by those skilled in the art, as was explained above in connection with the previous modification that is illustrated in FIGURE 1.

In the FIGURE 3 modification once more, as was the case with the FIGURE 1 modification, a series of records will be made from a plurality of charge locations in the usual manner. Thus, in FIGURE 3 there is shown a charge 40 and another charge 41, each of which will be fired to generate seismic energy from which a record is taken in each case by means of a subsurface detector 42 and 43 respectively in addition to a record made of reflected energy as it arrives at the surface and is picked up by a spread of detectors represented by a detector 46 and 47 respectively in each case.

It is to be noted that in connection with the FIGURE 3 modification, by reason of recording the downgoing seismic energy each time, the seismic energy amplitude involved may be reduced to a common level to compensate for differences in the amount of seismic energy created for each shot. In this manner the amplitudes of the reflections obtained from a reflecting layer 50 will be related to one another (following the relative adjustment) and will thus provide a direct indication of the reflection coefficient of reflecting layer 50.

It will be appreciated that (as already indicated above) in both modifications of the method which have been described above the recordings made will in fact employ a plurality of detectors spaced along the surface to record the seismic energy received from each explosive charge detonation. This is well known in the seismic reflection art and it will be understood that for each individual detector (or group of detectors) there will be included in the apparatus for recording the seismic energy, elements as schematically illustrated in FIGURE 5. Thus there is illustrated a detector 53 which receives the seismic energy waves and translates them into corresponding electrical signals that are connected over a circuit connection schematically illustrated by a line 54 to an amplifier 55 that then transmits the signals to a recorder 56. It is to be noted that an important aspect of the invention is the use of a linear amplifier for the amplifier 55. In this manner the amplitude characteristics of the seismic wave energies are faithfully reproduced without modification, such as has been caused by the use of various automatic gain control amplifier circuits in prior seismic amplifiers. It is to be understood however that with most recording apparatus, only a predetermined portion of the record will have the amplitude in a range for intelligible recording.

Referring to FIGURE 4, it is to be observed that an amplifier in accordance with this invention does not employ any automatic gain control circuits whatever. Consequently there must be employed a system which uses an attenuator that covers the wide range needed to be able to reduce the early high amplitude energy portion of a given record, to an output amplitude level for use in intelligibly recording same. Furthermore, the attenuator needs to cover the full range so that by employing the desired setting, in any given case, that portion of the record which includes information of interest, e.g. a reflection of interest, will have the output amplitude thereof at a desired level.

The foregoing attenuation is accomplished by employing two ranges of input attenuators. There is a large-step (coarse) attenuation network 60 which is followed by an intermediate-step (fine) attenuation network 61. After passing through these networks the signal is then applied to the amplifier via an input transformer 65 which has a secondary winding 66 that is connected to the inputs of a pair of transistors 67 and 68. These transistors are connected together in a balanced amplifier circuit in order to provide a large amplitude range of undistorted amplification. The output signals from transistors 67 and 68 are carried directly to the inputs of the next stage of amplification. This next stage amplification is carried out by another pair of transistors 71 and 72. These transistors are then connected with the outputs thereof coupled to the inputs for a third pair of transistors 73 and 74, and the outputs of transistors 73 and 74 are connected via a pair of output capacitors 77 and 78 to the input side of a low frequency output transformer 79. The secondary of output transformer 79 is connected via adjustable matching resistors to a pair of output terminals 80 and 81.

It is to be noted that in addition to the input attenuators 60 and 61 there may be included an internal attenuator arrangement within the amplifier circuit itself, e.g. that illustrated which includes a multiple-contact three position switch 85. It will be observed that the switch 85 connects a selected one of three different resistors 86 to be shunted across the collector circuits for transistors 67 and 68 as well as one of three other resistors that are in each case respectively connected in a degenerative feed back path associated with the second and third stages of the whole amplifier circuit, i.e. associated with transistors 71, 73 and 72, 74 respectively. The last named groups of three resistors are in addition selectively connected in the collector supply circuits for transistors 67 and 68.

By use of the input attenuator arrangement shown, i.e. attenuators 60 and 61, there are provided attenuation settings from a predetermined maximum, e.g. eighty decibel attenuation, to zero by steps of two decibels of attenuation. These attenuation steps may be had by setting the position for each of two multiple contact switches 90 and 91. Thus, for example, with contact 90 set at sixty decibels position the decible attenuation setting may be adjusted in steps of two decibels from sixty to eighty by setting the other multiple contact switch 91 at any one of its settings from zero to twenty decibels. The attenuation networks employed in connection with the attenuators 60 and 61 are well known, per se, to those skilled in the art and no further explanation need be given here. It will be sufficient to note that the electrical signals from a given detector 53 (FIGURE 5) for example will be applied to a pair of input terminals 92 and 93. These signals then travel over circuit connections 94 and 95 to the selected part of the attenuation networks 60 and 61, after which the signals are carried over a pair of circuit connectors 96 which lead to the primary or input winding of input transformer 65 via a pair of resistors 98 and 99.

It is pointed out that the amplifier illustrated in FIGURE 4 is especially applicable to the method according to this invention by reason of the fact that a highly linear amplification may be provided for signals over a range of signal frequencies from about two to about five hundred cycles per second. Among the attributes of this amplifier whereby such linear amplification is had is included the fact that there are not employed any capacitors throughout the amplifier circuit until after the output of the last stage thereof. Thus it is to be noted that there are no capacitors in the circuit shown in FIGURE 4, all the way through the circuit connections from input terminals 92 and 93 until the output side of the last stage (transistors 73 and 74) has been reached. This means that the amplifier is very stable and will accurately amplify signals over a wide range of frequencies.

Furthermore, another characteristic of the amplifier circuit employed is that involving the use of degenerative feed back connections with the balanced amplifier arrangement. These include a short circuit connection that acts to eliminate the feed back effect in connection with the desired signals while allowing the undesired signals to be substantially eliminated. A more detailed explanation follows.

A specific circuit for accomplishing the foregoing may be observed in connection with the first stage of the amplifier, i.e. that involving transistors 67 and 68. There is a degenerative feed back connection for each transistor. Thus, referring to transistor 67 it will be observed that there is connected to the collector, or output circuit thereof, a resistor 101 that is in series with another resistor 102 which in turn is connected via a connector 103 to the input or base connection of transistor 67. Likewise, transistor 68 has the output or collector connection thereof connected via a circuit connection 106 to a resistor 107 that is in series with another resistor 108 that is in turn connected at the other end thereof via a connector 109 to the input side or base of transistor 68. These feed back connections will cause any signal which affect the inputs of transistors 67 and 68 in the same manner, to be minimized by reason of the degenerative feed back effect at each of the transistors.

However, whenever desired signals are being applied via the output winding 66 of transformer 65 to the transistor inputs (in a differential or opposition manner) the output signals created thereby from transistors 67 and 68 will not be effective in the degenerative feed back paths just described. This is by reason of a short circuiting circuit connector 114 which is connected from the juncture or connection between resistors 101 and 102, to the corresponding juncture or connection between resistors 107 and 108. In this manner the differential signal is not effected by the degenerative feed back as is the case for any extraneous signals. Instead, the feed back paths are short circuited by connector 114, and consequently no degenerative feed back effect for wanted signals is had. Thus the desired signals pass fully amplified on through the amplifier.

It will be observed that a similar feed back circuit connection arrangement is provided from the output circuits of transistors 73 and 74, to the inputs for the intermediate stage transistors 71 and 72 respectively. These feed back paths include, respectively, a circuit connector 117 leading from the output side of transistor 73 to one side of a resistor 118 which has the other side thereof connected to a connector 119 that leads to a selected one of the three resistors 120 which in turn have the other end of each connected to the input, or base, terminal for transistor 71 via a circuit connector 121. The similar feed back path from the output of transistor 74, includes a circuit connector 124 leading to a resistor 125 which has the other end thereof connected over circuit connector 126 to a selected one of a group of three resistors 127. The other end of the selected resistor 127 is in each case connected to the input, or base, terminal of transistor 72 via an input connector 128. Here again, it is to be noted that there is a short circuiting connector 130 that directly connects connector 119 to connector 126 and corresponds to the above described short circuiting connector 114. Thus it will be observed that the same effect is had with regard the last two stages of amplification in that there is a pair of highly degenerative feed back paths for each of the two sides of the balanced amplifier stages, while at the same time there is a short circuiting connector to eliminate feed back of differential signals since the later are the desired signals passing through the amplifier.

An additional feature of the linear amplifier according to the invention is that a relatively direct connection is made from the collector potential supply to the collectors of the transistors employed in the amplifier. In this regard it is to be observed that there is a collector potential source 135 which may be a set of mercury batteries for providing an adequate constant potential supply. The connections from the transistor collector terminals are in every case as direct as possible with a minimum of resistance included in the paths leading from the potential source to the collector in each case. By this arrangement a minimum of disturbance will be had by reason of any temperature effects in connection with the resistors employed in the circuit.

While preferred modifications of the invention have been described above in considerable detail in accordance with the applicable statutes, this is not to be taken as in any way limiting the invention but merely as being descriptive thereof.

We claim:
1. In a seismic geophysical exploration system for determining the coefficient of reflection along a sub-surface layer, the improvement comprising an electronic amplifier having highly linear characteristics over a range of signal frequencies from about 2 to about 500 cycles per second, said amplifier comprising a direct coupled balanced transistor amplifier of the push-pull type, each transistor of said transistor amplifier having a base, emitter and collector electrode, said amplifier comprising a nonreactive input attenuator and having a low frequency transformer at the input and the output thereof, a degenerative feed back connection on each side of said balanced amplifier, each feed back connection extending from collector to base of respective transistors on each side of the balanced amplifier, said feed back connection including a short circuit connection connected between the feed back connections for eliminating feed back of differentially amplified signals.

2. The invention according to claim 1 wherein said transistor amplifier is arranged to eliminate capacitance ahead of the output from the last stage thereof.

References Cited by the Examiner
UNITED STATES PATENTS

| | | | |
|---|---|---|---|
| 1,784,439 | 12/1930 | Hayes | 181—0.5 |
| 2,118,441 | 5/1938 | McCollum | 181—0.5 |
| 2,281,949 | 5/1942 | Ritzmann | 340—15.5 |
| 2,292,136 | 8/1942 | Lindsay et al. | 330—81 |
| 2,351,456 | 6/1944 | Ricker | 340—15.5 |
| 2,792,067 | 5/1957 | Peterson | 181—0.5 |
| 2,835,748 | 5/1958 | Ensink et al. | 330—19 |
| 3,018,444 | 1/1962 | Offner | 330—19 |
| 3,102,984 | 9/1963 | Locanthi | 330—15 |

BENJAMIN A. BORCHELT, *Primary Examiner.*

KATHLEEN CLAFFY, SAMUEL FEINBERG,
*Examiners.*